No. 765,714. Patented July 26, 1904.

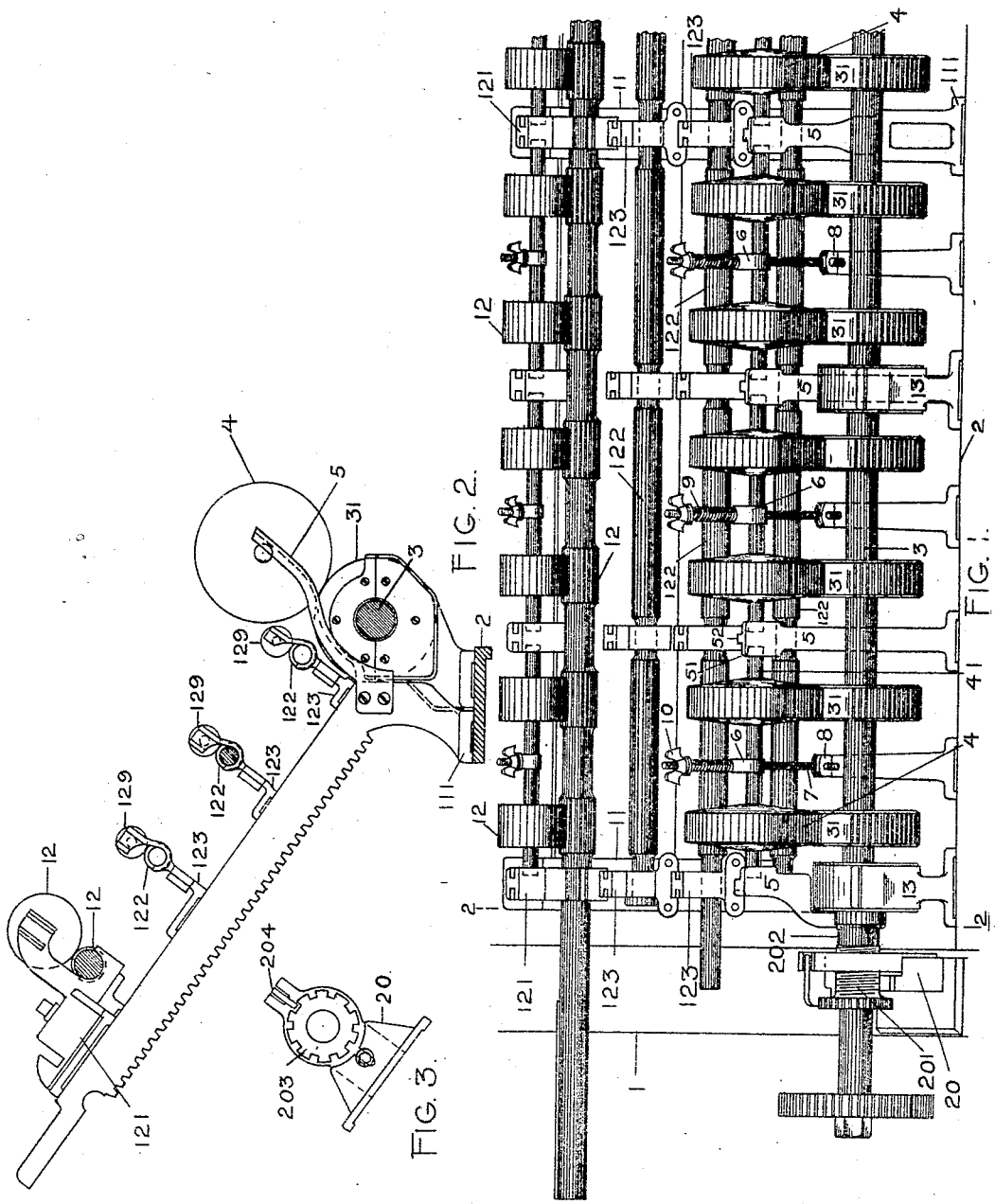

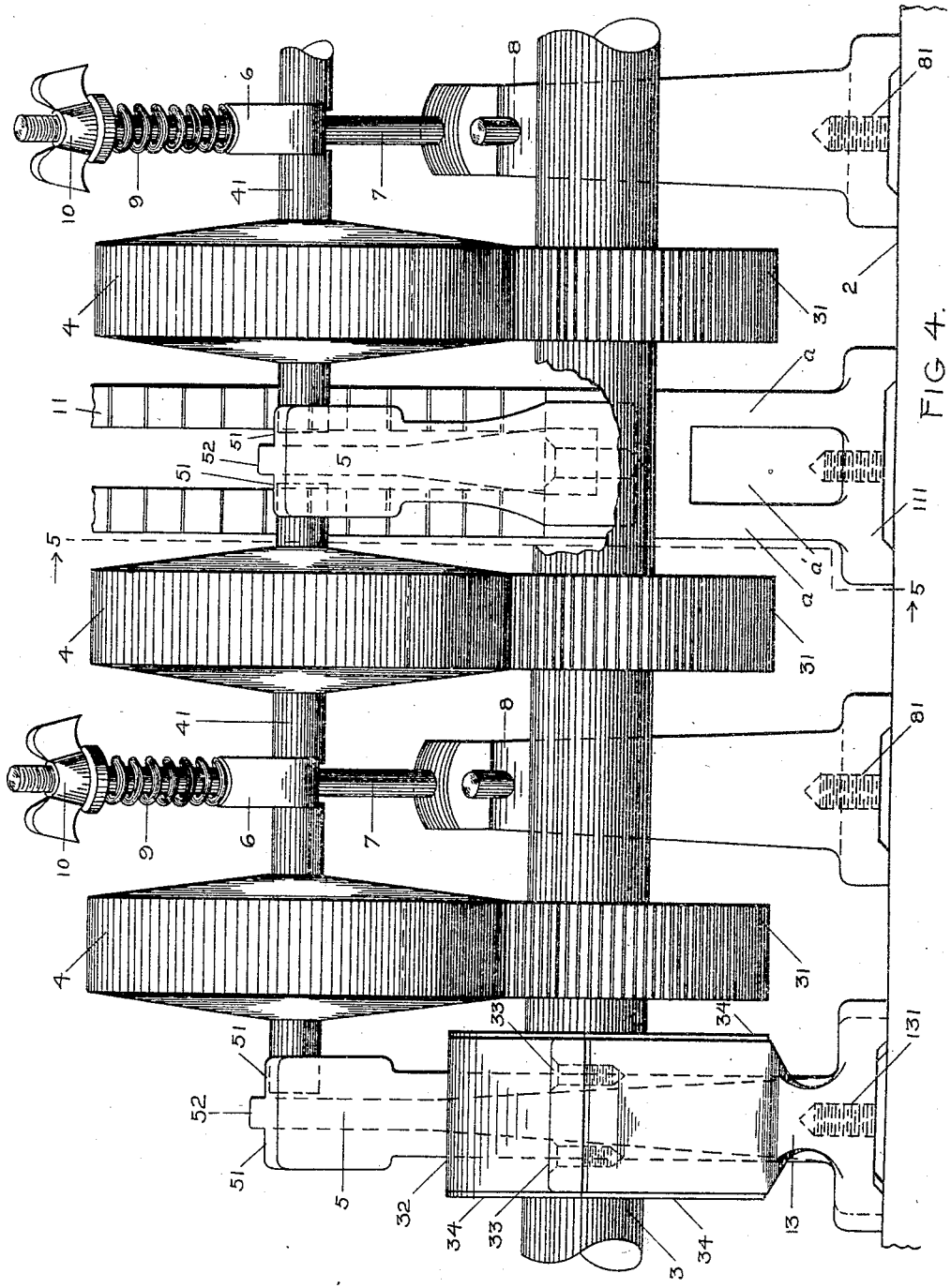

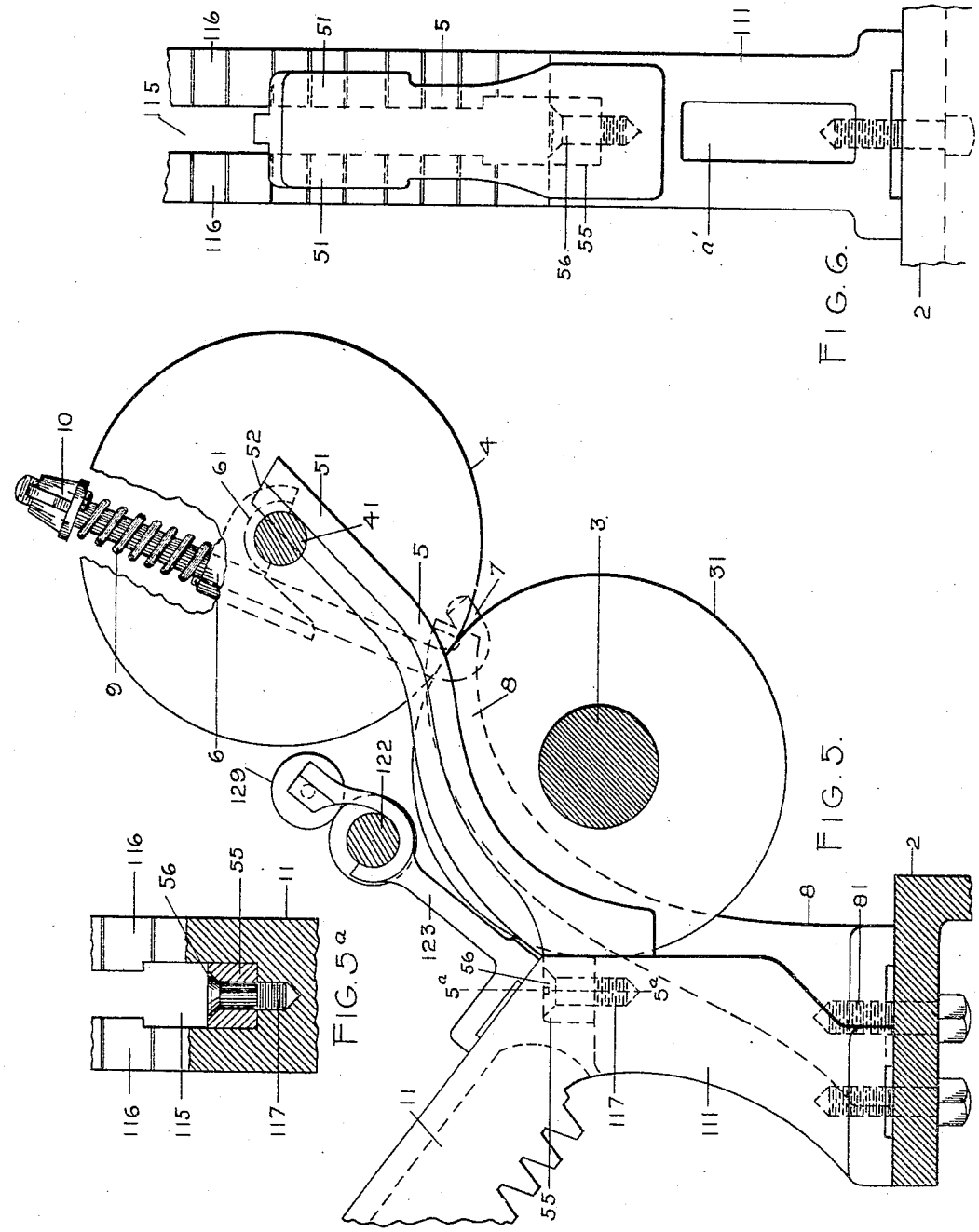

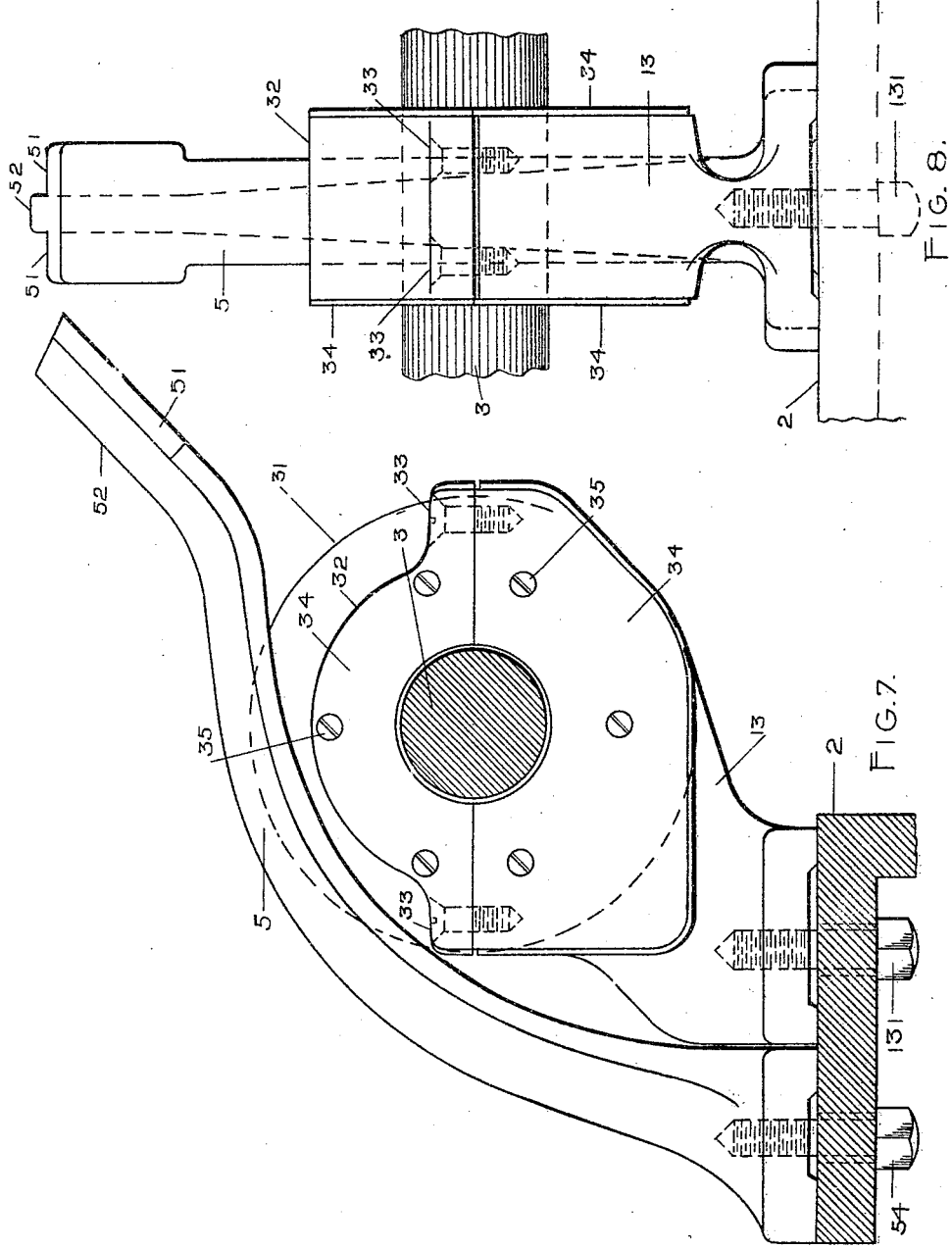

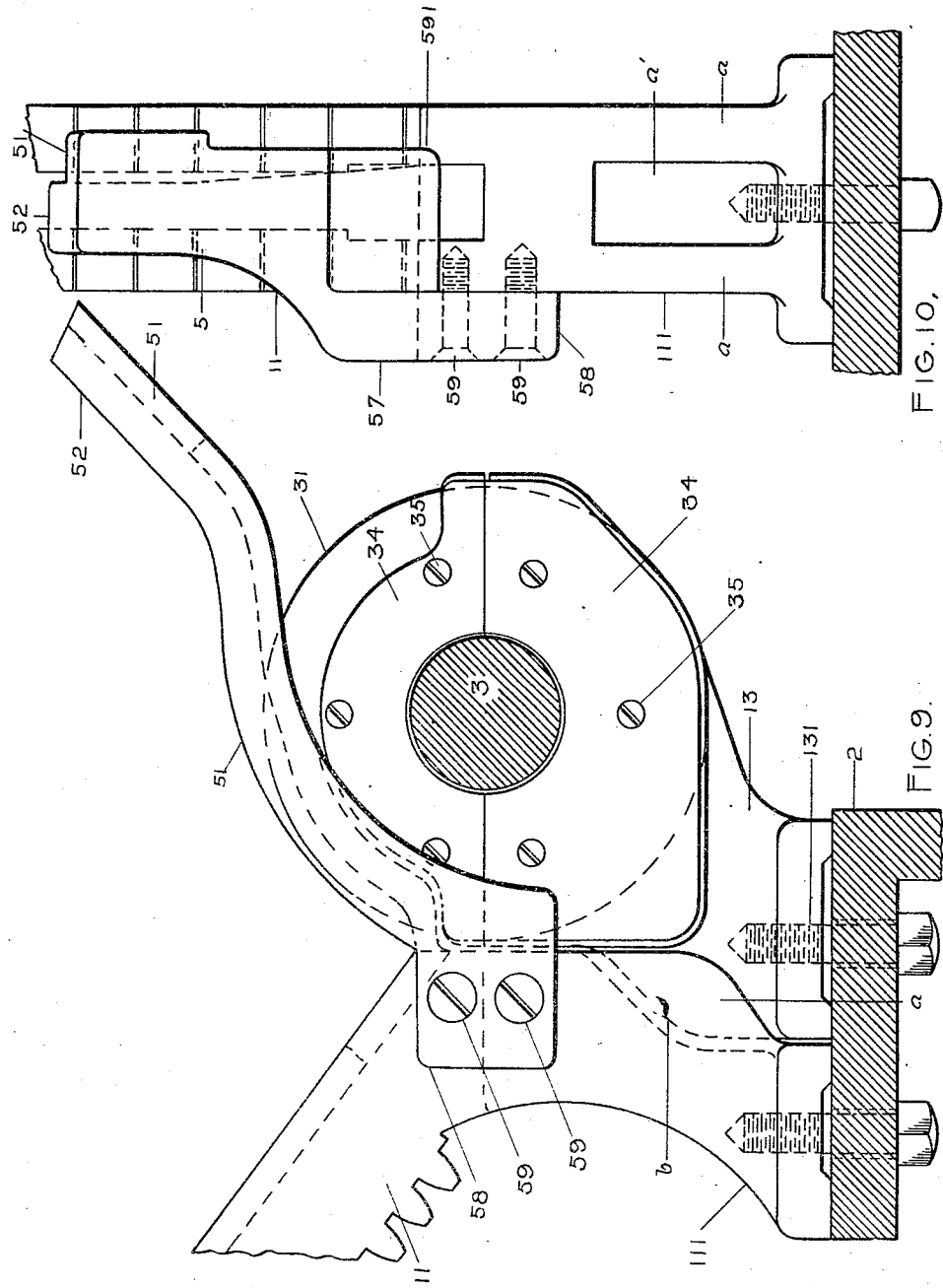

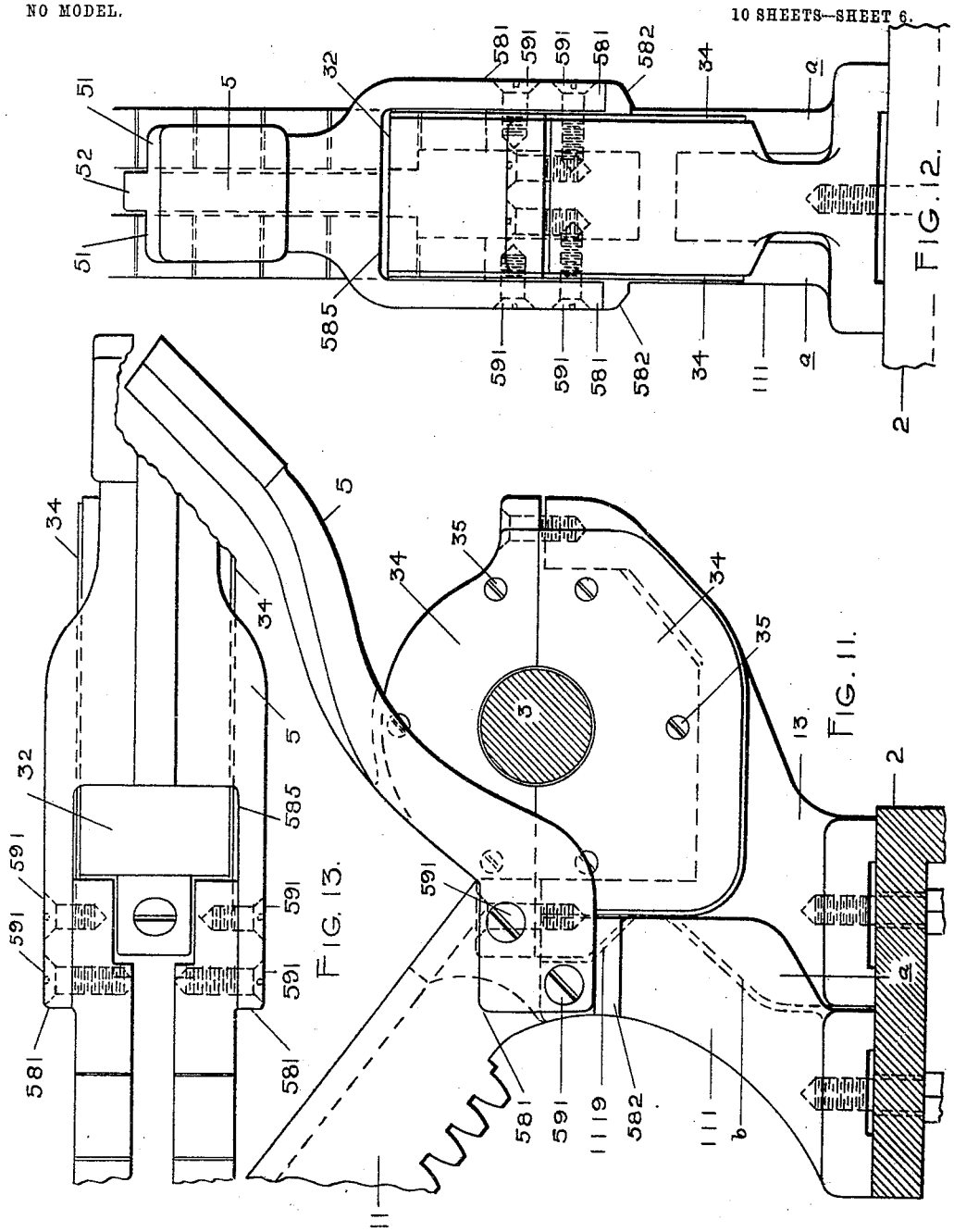

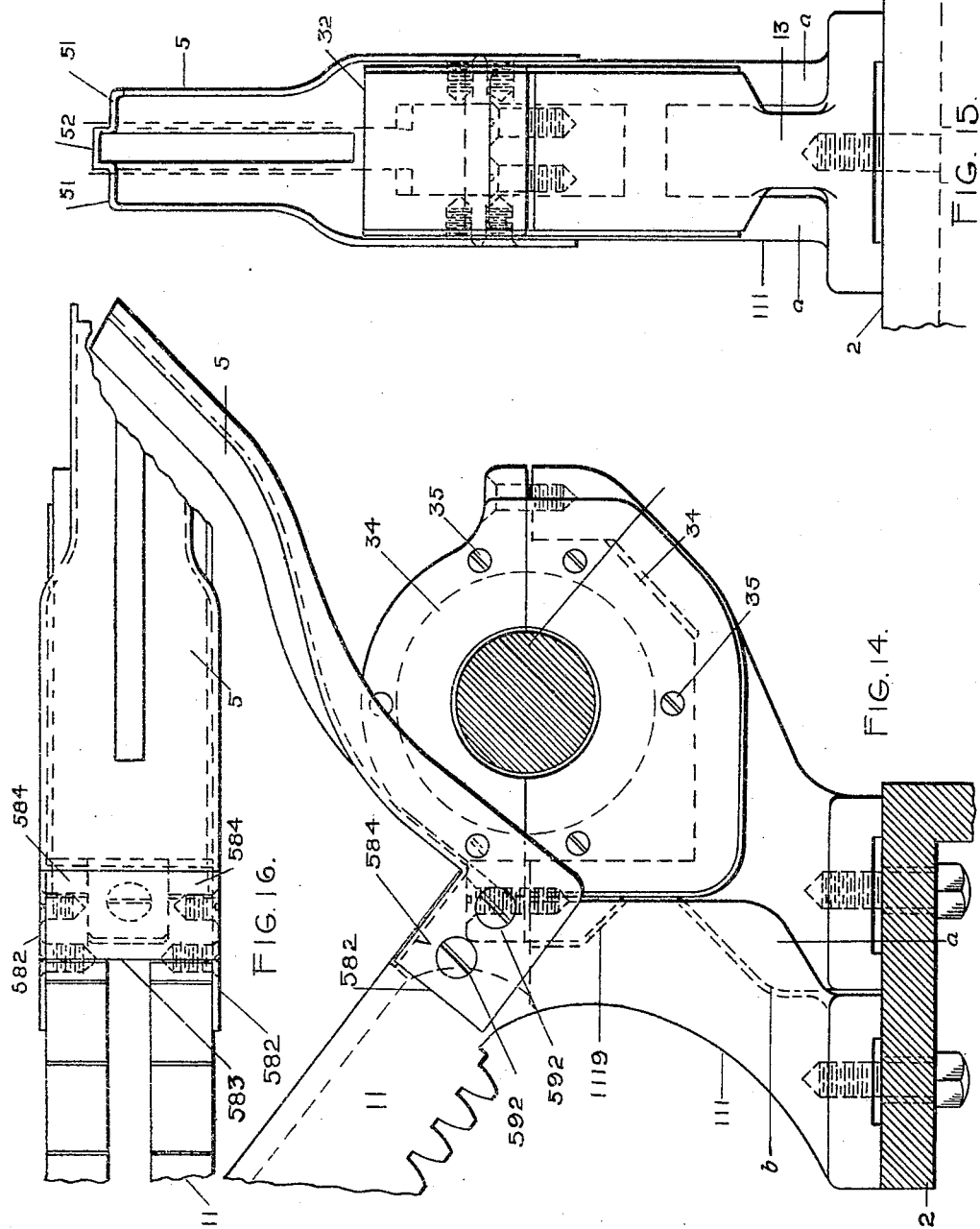

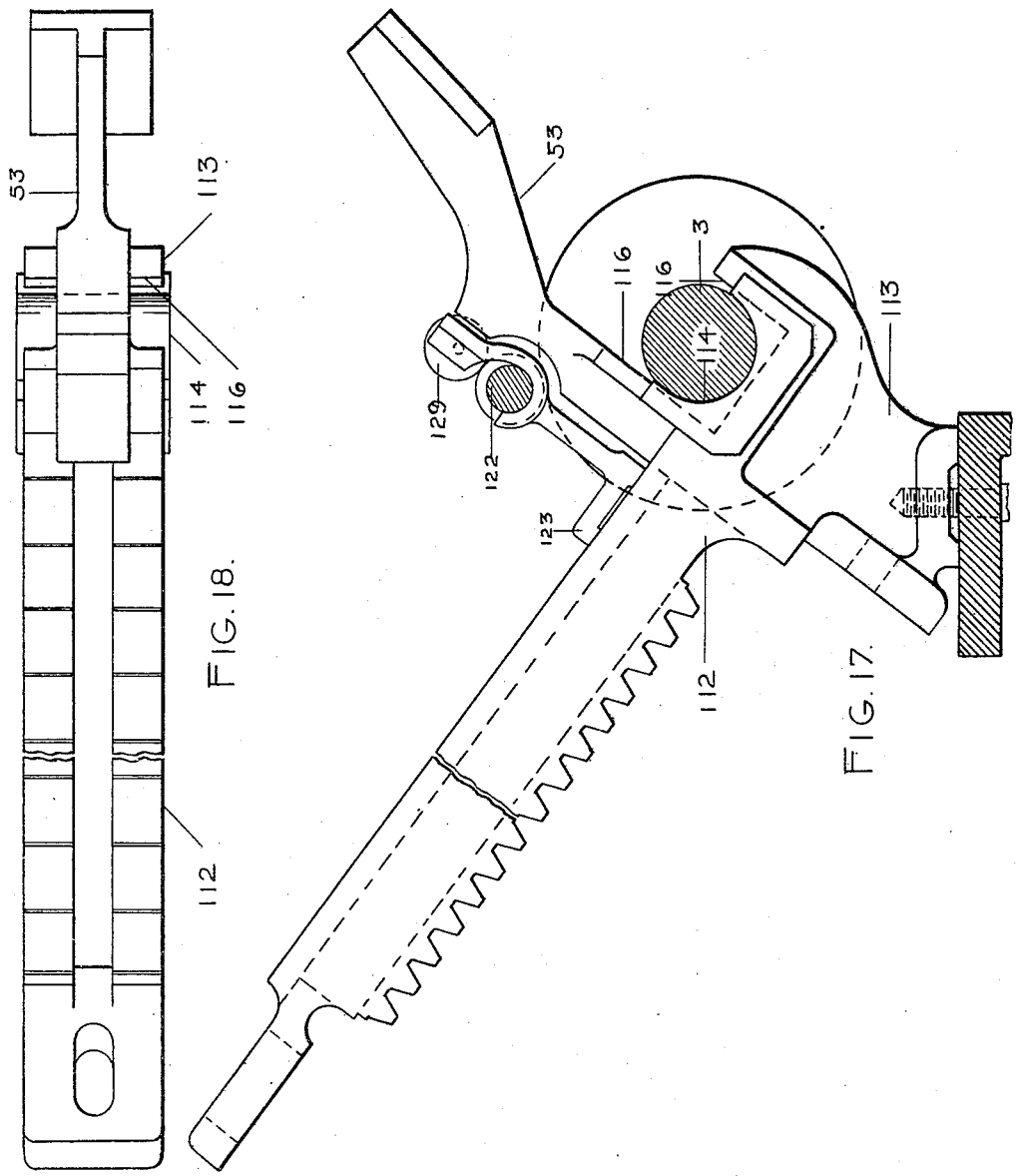

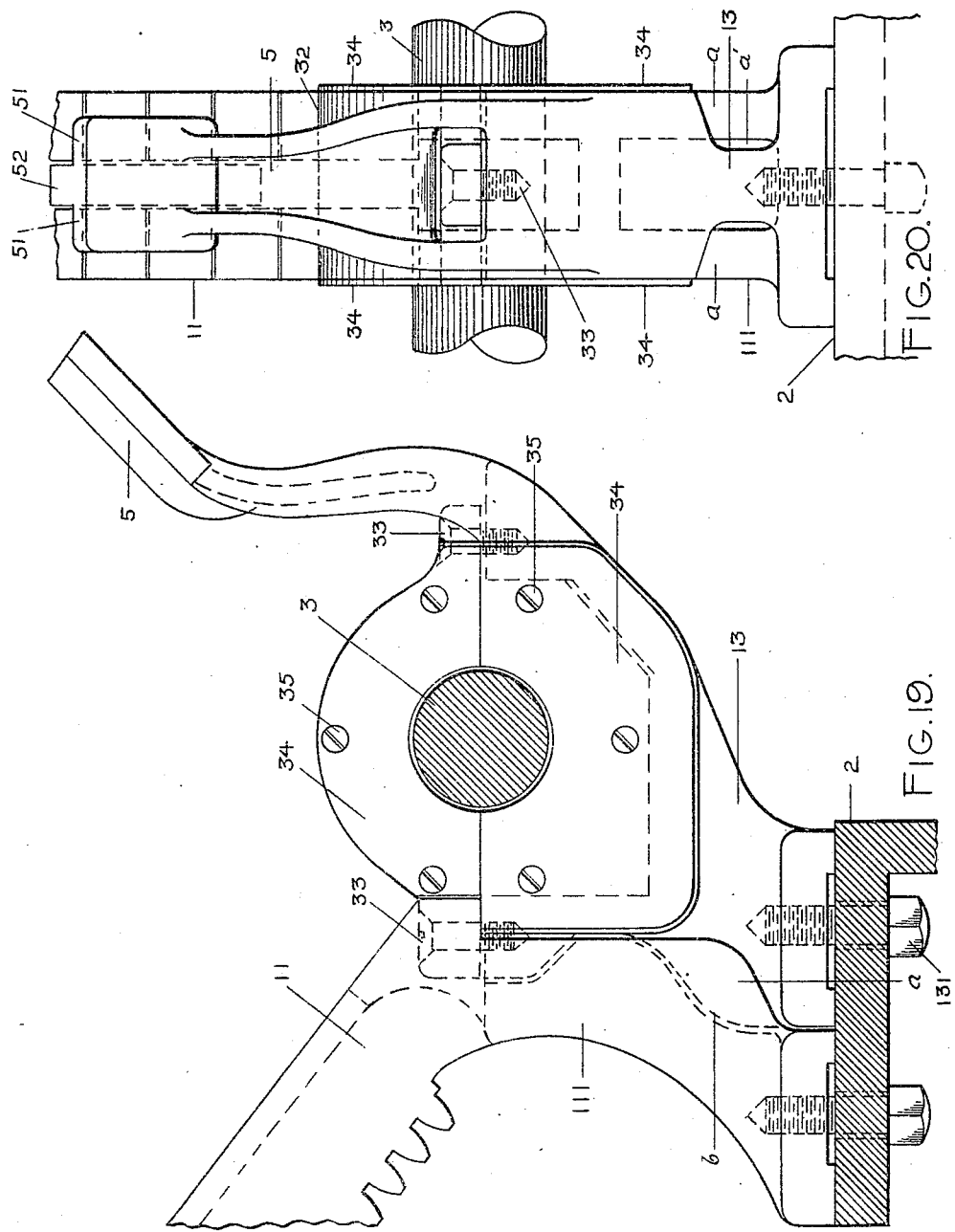

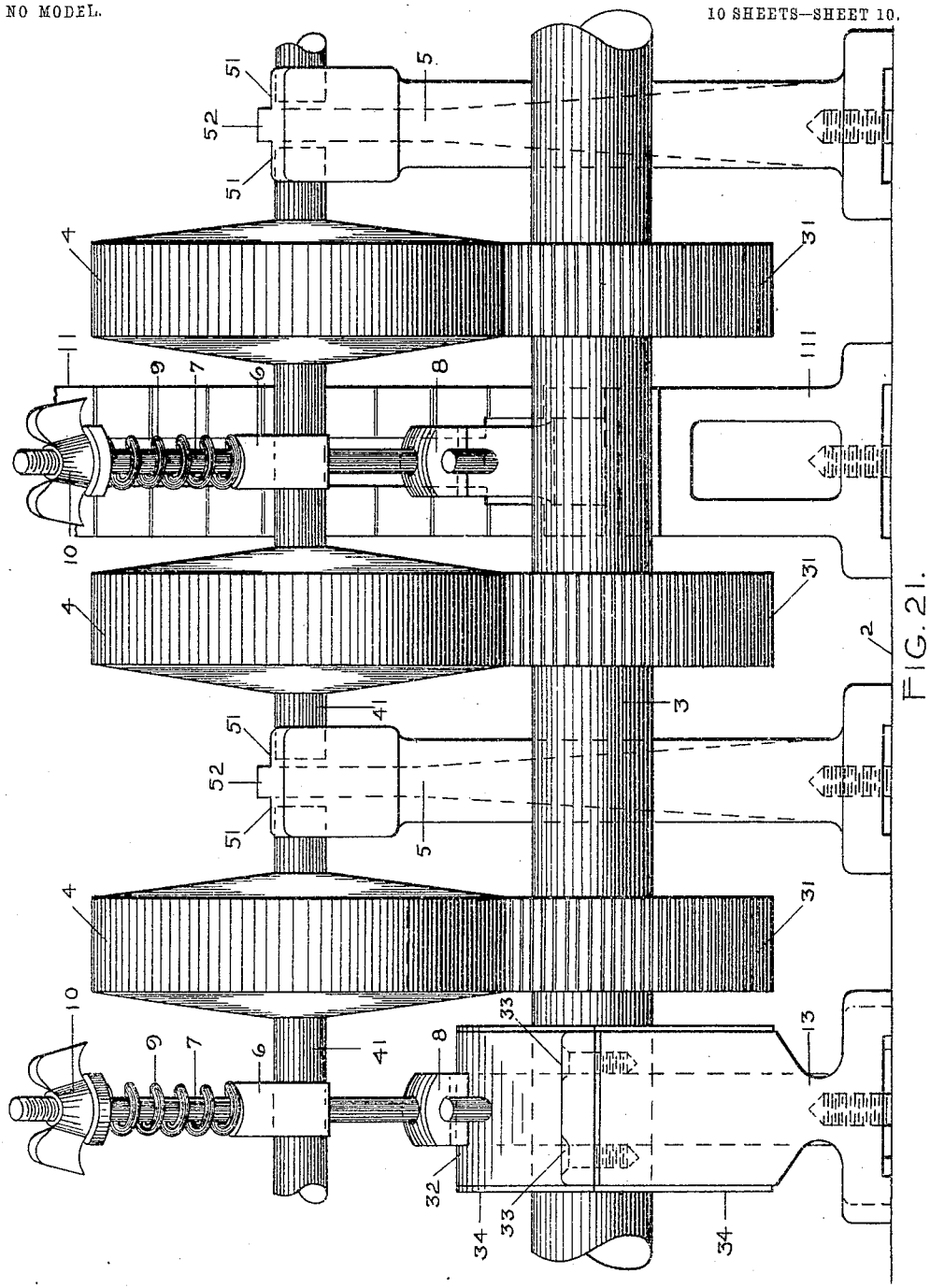

UNITED STATES PATENT OFFICE.

FREDERICK PIERPONT SHAW, OF LOWELL, MASSACHUSETTS, ASSIGNOR TO LOWELL MACHINE SHOP, OF LOWELL, MASSACHUSETTS, A CORPORATION OF MASSACHUSETTS.

MACHINE FOR PREPARING AND SPINNING WORSTED.

SPECIFICATION forming part of Letters Patent No. 765,714, dated July 26, 1904.

Application filed April 5, 1904. Serial No. 201,735. (No model.)

*To all whom it may concern:*

Be it known that I, FREDERICK PIERPONT SHAW, residing at Lowell, in the county of Middlesex and State of Massachusetts, have invented certain new and useful Improvements in Machines for Preparing and Spinning Worsted, of which the following description, with the accompanying drawings, is a specification, like characters on the drawings denoting like parts.

The invention has relation to drawing mechanism of the type that is employed in machines for preparing and spinning worsted and the like.

In particular the invention relates to the roll-stands (usually termed "carriage-stands" in the art) of mechanism of such type, to the means of supporting the lower front drawing-roll of such mechanism, and to the fixtures which are employed in connection with the front top rolls.

The invention consists in the improvements which I will describe with reference to the accompanying drawings, in which I have illustrated embodiments of the same in connection with a drawing mechanism which in general respects is of the character heretofore in use in worsted-spinning frames.

In the drawings, Figure 1, Sheet 1, shows in front elevation a portion of the length of the said mechanism with the invention applied thereto. Fig. 2, Sheet 1, is a view mainly in end elevation, showing the parts which are located at the right-hand side of the dotted line 2 2, Fig. 1. Fig. 3, Sheet 1, is a view showing separately in end elevation the thrust-bearing which appears in Fig. 1. Fig. 4, Sheet 2, is a detail view, in front elevation, showing an intermediate bearing and horn, an intermediate roll-stand and horn, and certain of the adjoining and associated parts. Fig. 5, Sheet 3, is a detail view, partly in vertical section, on the plane indicated by the dotted line 5 5 in Fig. 4, Sheet 2, the front carrier-stand and the rolls supported thereby being shown. Fig. 5ª, Sheet 3, is a detail view, in transverse vertical section, on the plane indicated by the dotted line 5ª 5ª in Fig. 5. Fig. 6, Sheet 3, shows in front elevation certain of the parts of Fig. 5—namely, a portion of the roller-beam, a portion of a roll-stand, and a horn which is applied to the said roll-stand. Fig. 7, Sheet 4, is a detail view showing in side elevation an intermediate bearing for the lower front drawing-roll, the adjacent horn, and one of the bosses of the lower front drawing-roll, the roller-beam and the shaft of said drawing-roll being shown in vertical section. Fig. 8, Sheet 4, shows in front elevation the bearing and horn of Fig. 7 and portion of the shaft of the lower front drawing-roll. Fig. 9, Sheet 5, is a detail view showing in side elevation certain parts at the left-hand end in Fig. 1—namely, the bearing at such end for the shaft of the lower front drawing-roll, the said shaft and one of the bosses thereon, the adjacent horn, and portion of the roll-stand at such end, the roller-beam being shown in vertical section. Fig. 10, Sheet 5, shows in front elevation the horn and portion of roll-stand which are represented in Fig. 9, together with portion of the roller-beam. Fig. 11, Sheet 6, is a view in side elevation on the order of Fig. 9, showing another form of horn embodying certain features of the invention. Fig. 12, same sheet, shows the parts of Fig. 11 in front elevation. Fig. 13 shows the parts of Fig. 11 in plan. Figs. 14, 15, and 16, Sheet 7, are views on the order of Figs. 11, 12, and 13, showing a further embodiment of the said features of the invention. Fig. 17, Sheet 8, shows in side elevation, with the roll-shaft in vertical section, a roll-stand, bearing, and horn of the construction usual heretofore and also the lower front drawing-roll, the front carrier-stand, and the rolls which are mounted on said carrier-stand. Fig. 18, Sheet 8, shows the roll-stand, horn, and bearing of Fig. 17 in plan. Fig. 19, Sheet 9, and Fig. 20, same sheet, show a construction in which the horn is located in front of the bearing. Fig. 21, Sheet 10, is a view similar to Fig. 4, but showing the horns and hooks interchanged in position with regard to the roll-stand and bearing and with the top rolls correspondingly disposed.

Having reference to the drawings, 1, Fig. 1, is one of the machine end frames, and 2, Figs. 1, 4, 5, &c., is a beam which extends longitudinally of the machine at the front of the latter and is attached to the fixed framework of the machine. The said beam is referred to hereinafter as the "roller-beam." Roll-stands, usually termed "carriage-stands" in the art, are shown at 11 11. A number of these are employed in the length of the machine. Their front ends are provided with feet 111 111, Figs. 2, 4, 5, 6, 9, 10, 11, &c., which rest upon and are secured to the roller-beam. Their rear ends are supported by portions of the framework which are not shown in the drawings. The rear drawing-rolls are represented at 12 12, Figs. 1 and 2. At 121 121, Figs. 1 and 2, are shown the stands for the said rear drawing-rolls. The said stands 121 121 are mounted upon the said roll-stands, being applied to the slideways or guideways with which the roll-stands are provided and are adjustable in well-known manner along the said slideways or guideways in the direction from front to rear in the machine to increase or diminish the distance separating the said rear drawing-rolls from the front drawing-rolls.

At 122 122, &c., are shown the usual carrier-rolls, which are located intermediate the rear drawing-rolls and the front drawing-rolls, and at 123 123, &c., are shown the carrier-stands, the said carrier-stands being mounted upon the roll-stands and adjustable along the slideways or guideways of the latter in usual manner in the direction from front to rear in the machine. The usual wooden presser-rolls which are applied in practice to the carrier-rolls for the purpose of holding the slivers or rovings pressed lightly against the latter are omitted from Fig. 1, but are shown in Fig. 2 at 129 129. The ends of the said presser-rolls are applied to guides with which the carrier-stands are furnished. The shaft of the lower front drawing-roll is shown at 3, and the drawing-bosses of the said drawing-roll are represented at 31 31, &c. The bearings which are provided at intervals in the length of the machine for the support of the said lower front drawing-roll will presently be referred to. The front top rolls, which coöperate with the bosses 31 31, &c., consist, as usual, of bosses 4 4, which are attached in pairs to short shafts 41 41, &c., the ends of each such short shaft projecting at the opposite sides of the pair of bosses thereon to constitute journals. The fixed "horns," so-called, rising adjacent the bosses 31 31, &c., and constituting guides for the said journals, whereby the working positions of the front top rolls with respect to the lower front drawing-rolls are determined, are marked 5 5, &c. The said horns are applied and supported in conformity with the present invention in the manner which presently will be explained. Each thereof is furnished, as usual, with one or more laterally-projecting wings 51 51, against the rear faces of which the journals of the front top rolls rest, and each horn has a longitudinally-extending rib 52. The ribs of the respective horns serve as guides, which coact with the ends of the journals of the front top rolls to prevent endwise movement of the said top rolls, and thereby fix the position, transversely considered, of the bosses 4 4 of the latter with relation to the bosses 31 31, &c., of the lower front drawing-roll. In the case of the horns which are located intermediate the extreme ones at the opposite ends of the machine the rib of each horn intervenes between and separates the adjacent journals of the two adjacent pairs of front top rolls. The bosses 4 4 of the front top rolls are pressed against the bosses 31 31 of the lower front drawing-roll by means of pressure or tension devices of usual character, such devices being represented in position in the general view, Fig. 1, and also illustrated on a larger scale and in detail in Fig. 4, Sheet 2, and Fig. 5, Sheet 3. The said pressure or tension devices comprise for each pair of front top-roll bosses a saddle 6, provided with a bearing-piece 61, Fig. 5, which fits the upper side of the shaft 41 of such pair of bosses, intermediate the latter, a stirrup 7 having the stem thereof passed through a hole in said saddle and its hook-shaped lower end passed through a hole in the fixed so-called "hook" 8 and engaged with the latter, an expanding spiral spring 9 surrounding the upper portion of the said stem above the saddle and a thumb-nut 10 screwed upon the threaded upper end of the stirrup, the said spring being compressed between the thumb-nut and the saddle and its tension being adjusted by means of the said thumb-nut to secure the desired pressure of the top-roll bosses 4 4 against the bosses 31 31. The bearing-piece 61 is formed of wood impregnated with a lubricant and is seated in a pocket or recess that is formed for its reception in the under side of the body of the saddle. In the construction which is shown in Figs. 1 to 5 the hooks 8 8, &c., which are employed at successive points in the length of the drawing mechanism, are separately attached by screws 81, Fig. 4, Sheet 2, and Fig. 5, Sheet 3, to the roller-beam 2. Pressure or tension devices, in the main similar to those which are used in connection with the front top rolls, are used with the rear top drawing-rolls.

Reference will now be made to the roll-stands, the bearings for the shaft 3 of the lower front drawing-roll and the horns. A roll-stand of the usual construction in practice is represented in Figs. 17 and 18, Sheet 8. In such figures the roll-stand is designated 112. Heretofore the practice has been to cast each roll-stand with an integral forward extension, as 113, Figs. 17 and 18, such extension constituting a support for one of the bearings, 114, for the lower front drawing-roll and to arrange a horn (designated 53 in the said figures) upon the roll-stand at the rear of the said bearing, the said horn rising from the roll-stand, of which latter it usually constitutes an integral portion between the bearing and the lower end of the slideway or guideway with which the roll-stand is furnished for the stands of the rear drawing-rolls and carrier-rolls. A drawback which is incident to the construction in which the roll-stand and bearing stand or support are integral with each other and which is the more pronounced when in addition the horn which is provided at the roll-stand is also integral with the roll-stand is the fact that when one integral portion alone becomes injured or broken the whole structure has to be removed from the drawing mechanism and discarded, and a complete combination roll-stand and bearing stand or support or complete combination roll-stand, horn, and bearing stand or support has to be substituted. This is serious, not only on account of the cost of the new combination structure, but because in order to enable a roll-stand to be removed from a drawing mechanism and a new one inserted in its place in such mechanism a great deal of labor and time is required to be expended, and the extensive dismantling of the drawing mechanism which is necessitated entails considerable loss of use of the machine. One object of my invention is to obviate the drawback aforesaid and to provide an improved construction which in case of breakage or injury will enable the broken or injured part to be replaced by a perfect one with a minimum of labor and expense and which in case of injury to either a bearing-stand or a horn or other top-roll fixture which is provided in connection with a bearing will permit the same to be removed and a fresh one applied without removal of the roll-stand or interruption of the working of the general machine. A further drawback which is incident to the usual construction that is shown in Figs. 17 and 18, Sheet 8, arises out of the fact that in case in alining the bearings for the lower front drawing-roll a particular bearing 114 should require adjustment upward or downward relative to its supporting roll-stand to compensate for some variation in the height of the portion of the machine in which such bearing is located such adjustment of the bearing relative to the roll-stand must be accompanied by a shift or adjustment of the said roll-stand horizontally in the direction from front to rear in the machine. This horizontal adjustment is made necessary by the fact that the front and rear walls 116 116 of the pocket or recess in the roll-stand within which the bearing is contained are inclined upward and forward, the direction of such inclination being at right angles to that of the forwardly and downwardly inclined slideway or guideway of the roll-stand. Any raising or lowering of the bearing between such inclined walls will produce a displacement of the bearing in the direction from front to rear unless an adjustment or shift of the roll-stand horizontally rearward or forward to the proper extent to offset the said displacement occurs. This compensating adjustment or shift of the roll-stand, however, has the effect of causing the roll-stand to occupy a position more or less out of alinement with respect to the remaining roll-stands, so that the distances between the lower ends of the slideways or guideways and the axis of the lower front drawing-roll will not be the same as the respective roll-stands. The differences in this respect at the various roll-stands result in more or less lack of uniformity in the spacing of the rolls at the respective roll-stands, as will be understood from reference to the plan view of a roll-stand in Fig. 18, Sheet 8. As shown in the said figure, the upper surface of the slideway or guideway of each roll-stand is marked or graduated by transverse lines, which are uniformly spaced apart in practice at a distance of one inch. The said lines are intended to facilitate the work of setting the stands for the rear drawing-rolls and the carrier-rolls in corresponding positions at the various roll-stands; but, as will be obvious, the departure of a given roll-stand from alinement with the others will result at such roll-stand in a variation in the distance between each of such lines and the axis of the lower front drawing-roll and in a corresponding variation in the spacing of the rear drawing-rolls and carrier-rolls with respect to the front drawing-rolls. Another object of the invention is to provide a convenient and practical construction which will overcome this drawback and enable the bearings of the lower front drawing-roll to be adjusted as may be required in alining the same with one another without disturbing or effecting the alinement of the roll-stands. Still another drawback of the usual construction grows out of the fact that in the said construction the roll-stand, horn, bearing support or extension, and bearing are located in line with one another and also in line with a given space between bosses 31 31 of the lower front drawing-roll in the direction from front to rear in the machine. Sometimes in practice it is necessary to work with the bite of the front carrier-roll 122 and its pressure-roll 129 as close to the bite of the front drawing-rolls as is possible to be secured without actual contact with the peripheries of the said carrier-roll and its pressure-roll with the peripheries of the bosses of the front drawing-rolls, as shown in Fig. 17, Sheet 8. This involves a very close approach of the front carrier-stands to the axis of the shaft of the lower front drawing-roll. In order to permit the required closeness of approach, it is necessary in the case of the usual construction above referred to, in consequence of the foregoing arrangement of the parts, that at each bearing the lower portion or post of the corresponding horn and the portion of the bearing which is located rearward of the journal portion of the shaft 3 of the lower front drawing-roll should together occupy a very small space, measuring in the direction from front to rear in the machine. For this reason in the previous constructions of drawing mechanism of the class to which the invention refers it has been found necessary to employ for the support of the lower front drawing-roll bearings occupying the smallest possible extent of space rearward of the journal portions of the said drawing-roll. In all cases known to me plain or simple bearings invariably have been employed in practice heretofore in the said connection, the usual form of bearing being shown in Figs. 17 and 18. For want of room for the convenient application of covers in front of the horns also the bearings heretofore have been left unprovided with covers and open-topped, as in the said figures, so far as I have observed in practice. In the operation of such previous constructions, the portions of the shaft of the lower front drawing-roll which work in the said bearings become covered with lubricant, and dust and flyings collect upon such portions in consequence of the absence of covers. As a result the lubricant of the bearings become charged with impurities which clog the bearings and cause cutting of the shaft and the bearings, as well as occasion other injuries. In particular the cutting of the shaft and bearings by particles of wool which work in between them is an extensive and serious cause of trouble and progresses rapidly. A further object of the invention, therefore, is to provide a construction of such character as to obviate the limitations and restrictions with respect to the bearings which heretofore have existed, which shall enable bearings of any approved proportions and character to be employed and more especially shall render possible and practicable the use of roller-bearings in case such employment is deemed advisable and which shall facilitate the use of covers in connection with the bearings.

In carrying my invention into effect instead of mounting the bearings for the lower front drawing-roll in supports which are integral with the roll-stands as heretofore I provide separate bearing-stands to contain the said bearings. One form of such bearing-stands is shown at 13, it being clearly represented in Fig. 4, Sheet 2, Figs. 7 and 8, Sheet 4, and Fig. 9, Sheet 5, &c. The said bearing-stands are removably attached to a convenient support or supports, preferably the roller-beam 2, as shown in the drawings, by means of suitable fastening devices—as, for instance, the screws 131. To permit of adjustment of the bearing-stand in the direction from front to rear, the said screws are passed through slots 139 in the roller-beam, which slots are elongated in the said direction. One advantage of mounting the said bearings in bearing-stands which are separate from the roll-stands instead of being integral therewith as heretofore is the fact that whenever necessary for any reason whatever a given bearing-stand with its bearing may be removed and subsequently restored to position or replaced by a fresh one without it being necessary to substitute a new roll-stand or even to remove one of the roll-stands. This also obviates the necessity for any extensive dismantling of the machine. So, too, a worn or injured roll-stand may be replaced by a new one without it being necessary to replace the adjacent bearing-stand by another. Another advantage incident to mounting the bearings for the lower front drawing-roll in separate and independent bearing-stands is the fact that this provides for enabling the bearings to be adjusted independently to the required extent in properly alining them when setting up the machine or at any other time without interference with the roll-stands or displacement of the latter. Hence the roll-stands may be set in correct alinement with one another, after which such alinement will not be disturbed by any ordinary adjustment of the bearing-stands and bearings. A further advantage is the fact that I am enabled to mount the roll-stand in line with one space between bosses 31 31 of the lower front drawing-roll and the bearing-stand within a different space between bosses of the said drawing-roll. This is illustrated clearly in Figs. 1 and 4. In these figures the bearing-stand is offset laterally with respect to the roll-stand to the extent of the distance corresponding with two of the spaces between bosses 31 31. This lateral offsetting of roll-stand and bearing-stand with reference to each other affords ample room for the accommodation of a horn or other top-roll fixture in line with the roll-stand and at the front of the latter, and of a horn or other top-roll fixture at the rear of the bearing-stand and in line with the latter. Horns thus arranged are represented in Figs. 1 and 4 and also are shown separately in Figs. 5 to 8. Thus Figs. 5, 5ª, and 6, Sheet 3, represent the front end of a roll-stand and the relation of the corresponding horn thereto. The said figures also show one manner in which a horn may be detachably mounted upon the front end of a roll-stand. In the same the base of the horn has a rear vertical bearing-face which fits against a corresponding face upon the front end of the roll-stand. The said base is formed with an attaching-lug 55, which projects rearwardly beyond the said rear vertical face of the base of the horn. In this instance the said lug occupies a horizontal position, and in assembling the parts the lug is entered within the vertical slot 115, which extends lengthwise of the roll-stand between the inner surfaces of the side portions 116 116 of the roll-stand. (See more particularly Fig. 5ᵃ.) The horn is retained in position on the roll-stand by means of a screw 56, the stem of which passes through a vertical hole in the said lug 55 and enters a threaded hole at 117, which is tapped into the foot portion of the roll-stand at the bottom of the said vertical slot. The described construction provides for a secure and steady attachment of the horn to the roll-stand with capacity for ready and convenient removal and replacement of the horn.

Figs. 7 and 8, Sheet 4, show a bearing-stand 13 mounted upon the roller-beam 2 and at the rear thereof a horn 5 rising above the said bearing-stand and extending forward vertically above the latter into proper working position. The means of applying and supporting the horn in connection with or adjacent to the bearing-stand may vary in practice. Figs. 7 and 8 show the horn as formed with a foot portion which fits the rear part of the roller-beam and is attached thereto by means of a screw 54. The separate mounting of the bearing-stand and horn upon the roller-beam 2 in Figs. 7 and 8 permits of independent setting and adjustment of the bearing-stand and horn with reference to each other.

To permit of adjustment of horn 5 in the direction from front to rear, the screw 54 is passed through a slot 541 in the roller-beam, which is elongated in the said direction.

As will be perceived, in Figs. 4 to 8 the horn is separately formed and is also removably attached to its support. In case of injury or breakage thereof it may be removed and replaced by a fresh one whenever required—as, for example, in case of injury thereto or breakage thereof.

In the case of the bearing at the end of the machine it usually is desirable that the bearing-stand should be arranged in line with the roll-stand that is located at such end of the machine, as indicated in Figs. 1, 2, and 9. In this connection in order to give ample space at the rear of the shaft 3 of the lower front drawing-roll the point or points of attachment or support for the horn is or are laterally offset with relation to the bearing for the lower front drawing-roll. Thus in Figs. 9 and 10 the upper portion or operative end of the horn is arranged in the same vertical plane with the bearing; but the lower or base portion of the horn has a lateral extension 57, (shown best in Fig. 10,) projecting toward the outer end of the machine and from which projects rearwardly a lug 58, the width of which extends vertically. The inner face of the said lug 58 is adapted to fit against the outer side of the foot portion of the roll-stand, and through holes extending transversely through the said lug are passed screws 59 59, which enter threaded holes that are tapped in the said foot portion of the roll-stand. Thereby the horn is secured in place.

The attachment of the horn to the support therefor by means of a laterally-offset lug, as in Figs. 9 and 10, and the offsetting laterally of the bearing-stand with relation to the roll-stand (shown by Fig. 4) permit ample room to be secured at the rear of the shaft of the lower front drawing-roll for the accommodation of bearings of the desired convenient proportions, and especially facilitate the application and employment of roller-bearings—such, for instance, as those which are shown and described in my application for United States Letters Patent, filed April 5, 1904, Serial No. 201,734. The employment of a cover is also made possible. A cover is indicated at 32, it having at the front and rear thereof horizontal portions or lips, through holes in which are passed securing-screws 33 33, Figs. 4, 7, and 8, the stems of the said screws entering threaded holes that are tapped in the top of the bearing-stand 13. In Figs. 4, 7, 8, 9, 11, and 12, 34 34 are thin casing-plates, which are secured to the opposite ends of the bearing-stand and cover by means of screws 35 35 and which at their inner edges fit closely around the shaft 3 of the front drawing-roll to exclude flyings and dust from the interior of the bearing.

Referring again to the horn and its attachment to the roll-stand in Figs. 9 and 10, it may be noted that although the particular construction which is shown in the said figures is more especially designed for use at the end of the machine such construction is capable of being used, if desired, in connection with the intermediate roll-stands either in machines in which the latter and the intermediate bearings are laterally offset with relation to each other or in machines in which the intermediate bearings are in line with the said intermediate roll-stands, provided that in the machines last mentioned the bosses 31 31 are spaced sufficiently far apart to enable the lateral extension or projection 57 of a horn to be received between a given bearing and an adjoining boss 31. In machines in which the spacing or gage between the bosses 31 31 of the lower front drawing-roll is narrow or close the use of a horn having a lateral extension or projection 57 of the relative proportions of that shown in Figs. 9 and 10 may not be feasible. I have shown in Figs. 11, 12, and 13, Sheet 6, and Figs. 14, 15, and 16, Sheet 7, embodiments of the principle of construction which characterizes the devices of Figs. 9 and 10, but in which there is less extension or projection of the attaching portions of the horns laterally of the bearings and which consequently are adapted to be employed not only in connection with the end bearing, but in connection with the intermediately-located bearings of machines of various gages or spacings of the bosses 31 31. In Figs. 11 to 13 the base portion of the horn has an attaching-lug, as 581, at each side thereof. The two lugs 581 581 of the horn are arranged parallel with each other and are laterally offset at opposite sides of the bearing sufficiently to extend on opposite sides of the front end of the roll-stand 11 and fit against the opposite outer surfaces of the said front end. By the employment of two lugs 581 581, one formed upon each side of the horn, it is rendered possible to secure the necessary strength and stiffness without the considerable transverse thickness of the single lateral extension or projection 57 of Figs. 9 and 10. The lateral extension or projection at each side of the horn therefore measures considerably less in Figs. 11 to 13 than the extension or projection 57 of Figs. 9 and 10. The pair of oppositely-located lugs 581 581 of Figs. 11 to 13, moreover, each provided with its attaching-screws 591 591, gives the requisite strength and stability, while enabling lightness to be secured, if desired. For the purpose of providing steadying or bearing faces the roll-stand is cast with a rib 582 upon each side of its foot portion 111. The upper surfaces of these ribs 582 582 are horizontal, and the lower edges of the lugs 581 581 are designed to take bearing vertically thereupon. The horns of Figs. 9, 10, and 11 to 13 are or may be produced by casting, as usual in the production of many of the fixed and other parts of drawing and spinning mechanism. In Figs. 14 to 16 I have represented a construction which in general respects is similar in form to that of Figs. 11 to 13, but which is formed of sheet metal bent or stamped into shape instead of being cast. In this instance the horn is formed with longitudinally-extending downturned marginal flanges to give the requisite stiffness and strength. In this instance also the flat bearing by which the horn is steadied is secured by forming the base portion of the horn with a transverse web 583, connecting the two attaching-lugs 582 582, and which when the parts are assembled rests upon surfaces, as 584 584, at the upper edges of the opposite side portions of the roll-stand 11 at the front end of the latter.

In Figs. 11 to 13 in order to enable a bearing of ample proportions to be employed and particularly to enable a roller-bearing to be employed, if desired, an opening 585 is formed between the opposite side portions of the base of the horn to accommodate the rear parts of the upper portion of the bearing and its cover. In order also to permit of a sufficiently close approach of the front carrier-stand to the axis of the lower front drawing-roll 3, the front of the roll-stand is recessed, as at 1119, to accommodate the rear portions of the bearing-stand and its cover, as shown best in Fig. 11. In Figs. 14, 15, and 16 the thinness of the sheet metal of which the horn is formed enables the main transverse web of the body of the horn to intervene between the cover of the bearing and the carrier-stand upon the front end of the roll-stand without interfering with the close adjustment of the parts. In this construction also the portions of the bearing stand and cover which project into the recess 1119 at the front of the foot portion 111 of the roll-stand extend beneath the transverse supplemental web 583, connecting the opposite attaching-lugs 582 582.

In Figs. 9 and 10, 11 and 12, and 14 and 15, as also in Fig. 4, in order to give strength and stiffness to the foot portion 111 of the roll-stand it is formed with forwardly-projecting webs or flanges $a\ a$, extending vertically and parallel with each other. For a similar reason a corresponding flange or web $b$, Figs. 9, 11, and 14, is formed upon the rear of the bearing-stand 13. The proximate portions of the front end of the roll-stand and bearing-stand are shaped to fit closely together. In order that the said webs or flanges may not interfere with the desired close setting of the bearing-stand with relation to the foot portion of the roll-stand, the web or flange $b$ of the bearing-stand is intermediately located and enters into the space $a'$, Figs. 6 and 11, which is formed between the webs or flanges $a\ a$.

In the construction which is represented in Figs. 19 and 20, Sheet 9, the horn is mounted upon the independent bearing-stand instead of upon the roll-stand and also is located entirely at the front of the shaft of the lower front drawing-roll and the bearing for such shaft instead of occupying the usual position at the rear thereof. With this arrangement of the horn considerable space is left available at the rear of the said shaft at the front end of the roll-stand to be occupied by the bearing and its cover or by the front carrier-stand. The remaining features of the construction which is shown in Figs. 19 and 20 are the same as those which already have been described herein.

To a certain extent the horns 5 and hooks 8 are interchangeable in position with relation to the roll-stands and the bearings. In other words, as shown in Fig. 21, Sheet 10, in cases in which it is desired that the top rolls, horns, hooks, bearings, and tension or pressure devices shall be so arranged as to cause the said tension or pressure devices to act in line vertically with a bearing—as, for instance, in my application for United States Letters Patent for improvements in machines for preparing and spinning worsted, filed April 5, 1904, Serial No. 201,736—a hook may be mounted upon the roll-stand, and another hook may be mounted upon the roller-beam in the same space with the bearing at the rear of the latter, while the horns may be mounted upon the roller-beam or other approved support. In the case of the arrangement of Fig.

21 any of the forms and constructions which have been described in connection with the horn may be adopted in connection with the hook.

My invention in its broader phase will be embodied equally in the case of the construction of Fig. 21, for, as will be perceived, essential principles of the same are contained in the same. For this reason, therefore, I designate both the horn and the hook "top-roll fixtures," and by the term "top-roll fixture," as employed in certain of the claims, I contemplate as well a hook as a horn for the purposes of such claims.

For the purpose of preventing the lower front drawing-roll from working endwise in the machine a thrust-bearing is provided therefor, comprising, essentially, a stand 20, Figs. 1 and 3, having an upward extension through which is formed a transverse opening somewhat larger in diameter than the shaft of the said roll. The wall of this opening is screw-threaded, and to the same is fitted the externally-threaded sleeve 201. The latter surrounds the shaft of the lower front drawing-roll and bears at its inner end against the outer side of a collar 202, which surrounds the said shaft and is shrunk thereon or otherwise made fast thereto. The sleeve is furnished at its outer end with a radially-enlarged collar or flange 203 for convenience in turning the sleeve by hand for purposes of adjustment. The said collar or flange is formed with a series of radial notches to receive the engaging portion of a locking device or latch 204, which latter is pivotally connected with the said stand 20.

I claim as my invention—

1. In a drawing mechanism, in combination, a roller-beam, a roll-stand secured to the said roller-beam, rear drawing-rolls mounted on the said stand, a lower front drawing-roll, and an independent bearing-stand for the said lower front drawing-roll, separately secured to the roller-beam adjacent the front end of said roll-stand.

2. In a drawing mechanism, in combination, a roller-beam, a roll-stand secured to the said roller-beam, rear drawing-rolls mounted on the said stand, a lower front drawing-roll, and a bearing-stand for the said lower front drawing-roll separately secured to the roller-beam, the roll-stand and independent bearing-stand being shaped to fit closely together and having the lower portions thereof overlapped with each other.

3. In a drawing mechanism, in combination, a roll-stand, a lower front drawing-roll, an independent bearing-stand for the said lower front drawing-roll adjacent the front end of said roll-stand, top rolls coacting with the said lower front drawing-roll, and an independent horn for engagement with the journals of said top rolls.

4. In a drawing mechanism, in combination, a roll-stand, a lower front drawing-roll, and a bearing-stand for the said lower front drawing-roll offset laterally with respect to said roll-stand the distance of one or more of the spaces between the roll-bosses.

5. In a drawing mechanism, in combination, a roll-stand, a lower front drawing-roll, a bearing-stand for the said lower front drawing-roll offset laterally with respect to the said roll-stand the distance of one or more of the spaces between the roll-bosses, top-roll fixtures respectively located in the same spaces with the said bearing-stand and roll-stand, and top rolls in operative engagement with the said top-roll fixtures.

6. In a drawing mechanism, in combination, a roll-stand, a lower front drawing-roll, a bearing-stand for the said lower front drawing-roll offset laterally with respect to the said roll-stand the distance of one or more of the spaces between the roll-bosses, and horns for engagement with front top-roll journals, respectively located in the same spaces with said bearing-stand and roll-stand.

7. In a drawing mechanism, in combination, a roller-beam, a roll-stand secured to the roller-beam, a lower front drawing-roll, a bearing-stand for the said lower front drawing-roll, secured to the roller-beam, and offset laterally with respect to the said roll-stand the distance of one or more of the spaces between the roll-bosses, top-roll fixtures attached, respectively, to the said roll-stand and to the roller-beam in the same space with said bearing-stand, and top rolls in operative engagement with the said top-roll fixtures.

8. In a drawing mechanism, in combination, a roller-beam, a roll-stand secured to the roller-beam, a lower front drawing-roll, a bearing-stand for the said lower front drawing-roll, secured to the roller-beam, and offset laterally with respect to said roll-stand the distance of one or more of the spaces between the roll-bosses, and horns for engagement with front top-roll journals, attached, respectively, to the said roll-stand, and to the roller-beam in the same space with said bearing-stand.

9. In a drawing mechanism, in combination, a roller-beam, a roll-stand secured to the roller-beam, a lower front drawing-roll, a top-roll fixture removably attached to the said roll-stand, a bearing-stand for the said lower front drawing-roll, secured to the roller-beam, and offset laterally with respect to said roll-stand the distance of one or more of the spaces between the roll-bosses, a top-roll fixture attached to the roller-beam in the same space with the said bearing-stand, and top rolls in operative engagement with the respective top-roll fixtures.

10. In a drawing mechanism, in combination, a roller-beam, a roll-stand secured to the roller-beam, a lower front drawing-roll, a horn removably attached to the said roll-stand for engagement with front top-roll journals, a bearing-stand for the said lower front drawing-roll, secured to the roller-beam, and offset laterally with respect to said roll-stand the distance of one or more of the spaces between the roll-bosses, and a horn for engagement with front top-roll journals, attached to the roller-beam in the same space with said bearing-stand.

11. In a drawing mechanism, in combination, a roller-beam, a lower front drawing-roll, rear drawing-rolls, adjacent roll-stands supporting the said rear drawing-rolls, a bearing located intermediate the said roll-stands and supporting the said lower front drawing-roll, a top-roll fixture, the said bearing and top-roll fixture being separately secured to the roller-beam within such portion of the length of the latter as includes two drawing-bosses and the space between them, and top rolls in operative engagement with the said top-roll fixture.

12. In a drawing mechanism, in combination, a roller-beam, a lower front drawing-roll, rear drawing-rolls, adjacent roll-stands supporting the said rear drawing-rolls, a bearing located intermediate the said roll-stands and supporting the said lower front drawing-roll, top rolls applied to the said lower front drawing-roll, and a horn for engagement with the top-roll journals, the said bearing and horn being separately secured to the roller-beam within such portion of the length of the latter as includes two drawing-bosses and the space between them.

13. In a drawing mechanism, in combination, a bearing, a lower front drawing-roll mounted in said bearing, a top-roll fixture having its operative portion in the same vertical plane with the said bearing and its point of support laterally offset with relation to the bearing, and top rolls in operative engagement with the said top-roll fixture.

14. In a drawing mechanism in combination, a bearing, a lower front drawing-roll mounted in said bearing, top front drawing-rolls, and a horn by which the working position of the said top front drawing-rolls is controlled, the said horn having its operative portion in the same vertical plane with the said bearing, and its point of support laterally offset with relation to the bearing.

15. In a drawing mechanism, in combination, a roll-stand, a bearing, a lower front drawing-roll mounted in said bearing, a top-roll fixture having its operative portion in the same vertical plane with the said bearing, and having also a supporting portion that is laterally offset with relation to the bearing, means for detachably securing the said supporting portion to the side of the roll-stand, and top rolls in operative engagement with the said top-roll fixture.

16. In a drawing mechanism, in combination, a roll-stand, a bearing, a lower front drawing-roll mounted in said bearing, top front drawing-rolls, a horn by which the working position of the said top front drawing-rolls is controlled, the said horn having its operative portion in the same vertical plane with the said bearing, and having also a supporting portion that is laterally offset with relation to the bearing, and means for detachably securing the said supporting portion to the side of the roll-stand.

17. In a drawing mechanism, in combination, a bearing, a lower front drawing-roll mounted in said bearing, top front drawing-rolls, a horn by which the working position of the said top front drawing-rolls is controlled, the said horn having its operative portion in the same vertical plane with the said bearing, and also having an attaching-foot that is laterally offset with relation to the bearing, and means for connecting the said foot to its support.

18. In a drawing mechanism, in combination, a bearing, a lower front drawing-roll mounted in said bearing, a top-roll fixture having its operative portion in the same vertical plane with the said bearing, and having attaching lugs or feet at opposite sides of the said bearing, means to attach the said lugs or feet to their support, and, top rolls in operative engagement with the said top-roll fixture.

19. In a drawing mechanism, in combination, a bearing, a lower front drawing-roll mounted in said bearing, top front drawing-rolls, a horn by which the working position of the said top front drawing-rolls is controlled, the said horn having its operative portion in the same vertical plane with the said bearing, and having attaching lugs or feet at opposite sides of the said bearing, and means to attach the said lugs or feet to their support.

20. In a drawing mechanism, in combination, a roll-stand, a bearing, a lower front drawing-roll mounted in said bearing, a top-roll fixture having its operative portion in the same vertical plane with the said bearing and having attaching lugs or feet at opposite sides of the said bearing which are affixed to the said roll-stand, and top rolls in operative engagement with the said top-roll fixture.

21. In a drawing mechanism, in combination, a bearing, a lower front drawing-roll mounted in said bearing, a top-roll fixture having its operative portion in the same vertical plane with the said bearing, and having its lower portion formed with an opening extending partly across its width to accommodate the rear portion of the bearing or its cover, and top rolls in operative engagement with the said top-roll fixture.

22. In a drawing mechanism, in combination, a roll-stand, a bearing, a lower front drawing-roll mounted in said bearing, top front drawing-rolls, a horn by which the working position of the said top front drawing-rolls is controlled, the said horn having its operative portion in the same vertical plane with the said bearing, and also having a bearing-face for engagement with a corresponding face on the support to steady and brace the horn, and the said horn having an attaching-lug, and an attaching-screw engaging with the said lug and with the support to secure the horn to the latter.

23. In a drawing mechanism, in combination, a roll-stand, rear drawing-rolls mounted on the said stand, a lower front drawing-roll, an independent bearing-stand for the said lower front drawing-roll located adjacent the front end of the said roll-stand, and means to support the said roll-stand and independent bearing-stand.

24. In a drawing mechanism, in combination, a roll-stand, a lower front drawing-roll, an independent bearing-stand for the said lower front drawing-roll adjacent the front end of the said roll-stand, a separate top-roll fixture, and top rolls in operative engagement with the said top-roll fixture.

In testimony whereof I affix my signature in the presence of two witnesses.

FREDERICK PIERPONT SHAW.

Witnesses:
ESTHER PERRY TAYLOR,
IRVING DUNNING KIMBALL.